United States Patent
Nath

(10) Patent No.: US 10,061,923 B1
(45) Date of Patent: Aug. 28, 2018

(54) SAFE AND SECURE INTERNET OR NETWORK CONNECTED COMPUTING MACHINE PROVIDING MEANS FOR PROCESSING, MANIPULATING, RECEIVING, TRANSMITTING AND STORING INFORMATION FREE FROM HACKERS, HIJACKERS, VIRUS, MALWARE ETC.

(71) Applicant: Pritam Nath, Los Angeles, CA (US)

(72) Inventor: Pritam Nath, Los Angeles, CA (US)

(*) Notice: Subject to any disclaimer, the term of this patent is extended or adjusted under 35 U.S.C. 154(b) by 0 days.

(21) Appl. No.: 15/731,536

(22) Filed: Jun. 26, 2017

(51) Int. Cl.
*G06F 7/08* (2006.01)
*G06F 21/56* (2013.01)
*G06F 21/55* (2013.01)
*G06F 7/24* (2006.01)

(52) U.S. Cl.
CPC .......... *G06F 21/565* (2013.01); *G06F 21/552* (2013.01); *G06F 21/554* (2013.01); *G06F 21/566* (2013.01); *G06F 21/567* (2013.01)

(58) Field of Classification Search
None
See application file for complete search history.

(56) References Cited

U.S. PATENT DOCUMENTS

| | | | | |
|---|---|---|---|---|
| 2007/0192854 A1* | 8/2007 | Kelley | ............. | G06F 21/53 726/22 |
| 2015/0281336 A1* | 10/2015 | Beale | ............. | G06F 9/4856 709/201 |
| 2017/0262346 A1* | 9/2017 | Pradhan | ............. | G06F 11/1464 |

OTHER PUBLICATIONS

Parallel Implementation of Spatial Pooler in Hierarchical Temporal Memory. Pietron et al. ICAART. (Year: 2016).*

* cited by examiner

*Primary Examiner* — Venkat Perungavoor
(74) *Attorney, Agent, or Firm* — Eric Kelly

(57) ABSTRACT

A computing machine that minimizes problems from external files, such as software virus and malware is disclosed. The computing machine has local operations separated from external operations, such that the external files are isolated from the hardware associated with the local operations. The local side hardware may include a Memory One, a Main Memory 3, and a Storage One device. The external side hardware may include a Memory Two, a Main Memory 4, and a Storage Two device. The internal side hardware are not in communication with the external side hardware. Operating system software may be stored in Memory One or in a secure partition of Storage One device. Data from local operations and local application programs may be stored in Storage One device. Internet browsing software may be stored in Memory Two or in a secure partition of Storage Two device.

20 Claims, 11 Drawing Sheets

Proposed Computing Machine's System Motherboard Diagram (Continued) EMBODIMENT 1.

SAFE AND SECURE INTERNET OR NETWORK CONNECTED COMPUTING MACHINE PROVIDING MEANS FOR PROCESSING, MANIPULATING, RECEIVING, TRANSMITTING AND STORING INFORMATION FREE FROM HACKERS, HIJACKERS, VIRUS, MALWARE ETC.

CROSS REFERENCE TO RELATED APPLICATIONS

Not Applicable

FEDERALLY SPONSORED RESEARCH

Not Applicable

SEQUENCE LISTING OR PROGRAM

Not Applicable

TECHNICAL FIELD

The present invention relates to any Computing Machine, present or future, that can connect to or is connected with the outside world communications, Internet, Network(s) etc. such as, but not limited to, Personal Computers, Laptops, Servers, Main Frame Computers, Tablets, Telephones, Cell or Mobile Phones, TVs, Security Systems, Remote Data Sensors etc.

BACKGROUND ART—DISCUSSION OF PRIOR ART

For this application purposes a Computing Machines is defined as an Internet or Network connected device that computes, stores, manipulates, receives and transmits information over the Internet or Networks. Some of the examples of Internet or Network connected Computing Machines but not limited to the following are Personal Computers, Computer Laptops, Computer Servers, Mainframe Computers, Cell Phones, Tablets etc.

1. A Brief Description of Current State of Most Common Network and/or Internet Connected Computing Machines are;
 (i) Internet connected Personal Computer.
   It is a Computing Machines that is heavy on computing and light on input or output of the Information.
 (ii) Internet connected Laptop Computer. It is a miniaturized version of a Personal Computer.
 (iii) Internet connected Server Computer.
   It is heavy on input and output functions and light on computing functions.
 (iv) Internet connected Mobile or Cell Phones.
   It is used for receiving & transmitting voice, data and video.
 (v) Internet connected Entertainment Devices.
   It is used for TV and Games etc.
 (vi) Internet connected Main Frame Computer.
   It is very heavy on Information processing and very light on input/output.
 (vii) Computer Tablets.
   It is a limited and light version of a Computer Laptop.
 (viii) Business & Home Security Systems.
   These are Internet or Network connected security systems for monitoring physical locations to detect intrusions.
 (ix) Remote Data Sensors.
   These are Internet or Network connected devices to collect data at remote locations.

2. Operational Aspects of the Current Internet or Network Connected Existing Computing Machine(s).
 (i) A "POWER ON" button on the Computing Machine starts the BIOS (Basic input and output system) the Software Package residing on the motherboard of Existing Computing Machine. The software initializes all the input/output devices built into the Computing Machine, See FIG. 1 Item 5.
 (ii) Once all the input/output devices are made operational, the Operating System is copied from the storage device(s), FIG. 1 Item 13, to Main Memory, FIG. 1 Item 8. The control of said Computing Machine is transferred to the Operating System Software residing in the Main Memory FIG. 1 Item 8. The Operating System Software executes the Internet Browser or Network software and/or several Application Softwares. Several windows appear on the Monitor FIG. 1 Item 7 showing various Application Software Packages ready to execute or executing. This includes Internet Browser, Network Software and any other pre-designated application software. Prior to pressing on the "POWER ON" button, FIG. 1 Item 5, all the software, the Operating System Software, Internet Browser Software, Application's Software etc. reside on the Storage device, FIG. 1 Item 13. There are several Operating Systems in the market like Microsoft Windows, Apple Operating Systems, System 10, X-Windows etc. There are several Internet Browsers in the market such as Google, Yahoo, Bing, Safari, Mozilla Firefox etc.
   The user operates Existing Computing Machine to do his/her processing. Once the user is done with the processing, the user turns off Existing Computing Machine. All the System Software, the Operating System Software, the Internet Browser Software, Application's Software etc. along with data files (which include new or modified data created by the user in the current session) are copied back to the Storage device, FIG. 1 Item 13, automatically.

3. Problems Associated with Existing Computing Machines.
   There are enormous problems of tempering with or hacking or hijacking of various Internet Connected Existing Computing Machines.
 (i) Viruses and malwares are injected into the Existing Computing Machines via the Internet thereby blocking or corrupting the Existing Computing Machines rendering them unable to function correctly.
 (ii) Sometimes the Existing Computing Machines are hijacked for vengeance purposes. Malware installed via the Internet takes control of the Existing Computing Machines stealing users personal information including passwords etc. The crooks then commit credit card frauds, bank account frauds etc. Once personal identification information is in the wrong hands, it is used to create a whole array of problems for the victims—too numerous to mention here. Various businesses, banks, universities, healthcare organizations, city, state and federal government departments have been victims of hacking. Needless to say the problems are huge and billions of dollars are lost each year this way.
 (iv) Various currently used Operating Systems (the software that controls and operates the Existing Computing Machines) allow remote control of Computing Machines by someone sitting thousands of miles away. It is very easy for someone with a good knowledge of internal workings of the Existing Computing Machines to steal information from these Computing Machines.

(v) There are many ways a virus or malware can get into the system via Internet or Network connected to the outside world. Once a virus or a malware takes hold in a Existing Computing Machine it is very hard and time consuming to get rid of it. Most user and businesses are unable to handle the problem. They spend a lot of money, other resources and time to get rid of the problem. There are many security companies that provide the services to solve these problems. Sometime they work, sometime they don't. In lot of cases everything on the Existing Computing Machine has to be deleted and all the software has to be reinstalled, only to have the problems occur again and again.

(vi) The hackers take control of Existing Computing Machines, steel the personal information render it in-operational and ask for ransom to release their control.

(vii) The current operating systems have built-in backdoor which are used to tinker with the software for good and bad purposes.

A. APPLICABILITY OF THE PROPOSED COMPUTING MACHINE

This proposed Computing Machine concept is directly applicable to the following:

1. Computing Machine commonly known as Desktop or Personal Computer (PC) connected to internet or outside networks. This machine is heavy on the computing aspects and can be light on the transmission of input/output of the data.
2. Computing Machine commonly known as Laptop Computer connected to internet or outside networks. This is a miniature version of Desktop or Personal Computer. This machine is heavy on the computing aspects and can be light on the transmission of input/output of data.
3. Computing Machine commonly known as Network Server connected to Internet or outside Networks. This machine is light on the computing aspects and heavy on the transmission of input/output of data. It is used in businesses and all kinds of organizations to disseminate information to the users situated at onsite or offsite locations.
4. Computing Machine commonly known as Mainframe connected to internet or outside networks. This machine may be heavy or light on the computing aspects and may be heavy or light on the transmission of input/output of the data depending upon the usage of this computing machine.
5. Computing Machine commonly known as Mobile or Cell Phone and Landline connected to Internet or outside Networks. This type of Computing Machine is heavy on the transmission of input/output of voice and data and light on the computing of data.
6. Entertainment Devices like TVs, Computing Tablets, Gaming Devices etc.
7. Remote Sensing Devices connected to Internet or Networks.
8. Any past, present or future Computing Machine that is connected to Internet or Networks to compute data or transmit data to and from different physical locations. A network is defined as a system to facilitate transmission of data to and from at two or more separate physical locations by electronic means.

B. BRIEF DESCRIPTION OF THE DRAWINGS

DRAWINGS—REFERENCE NUMERALS

Figure 1:
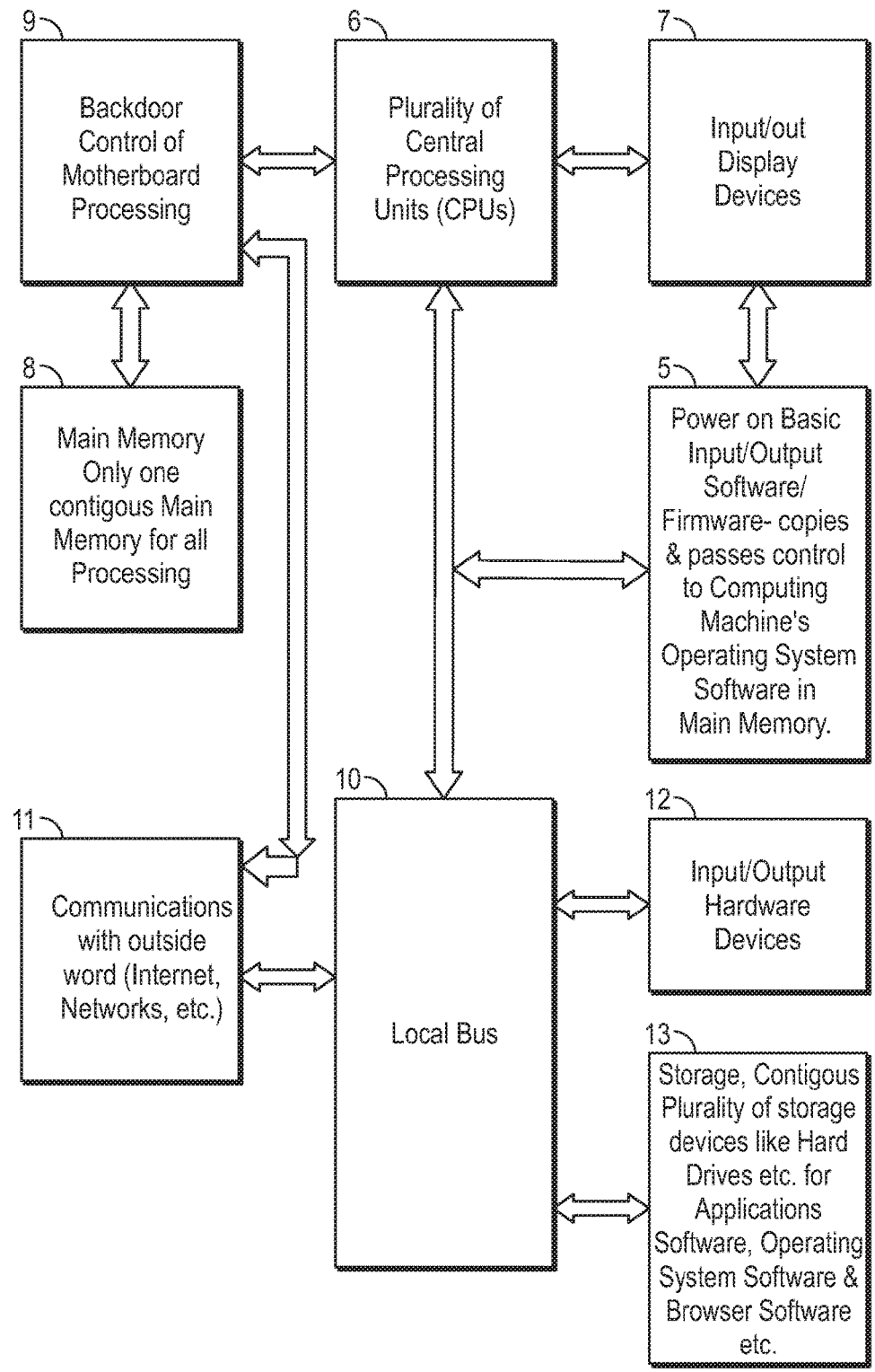
FIG. 1 is a Block Diagram of design of an Existing Computing Machine System Motherboard for a typical modern personal computer, laptop or server.
Figure 2:
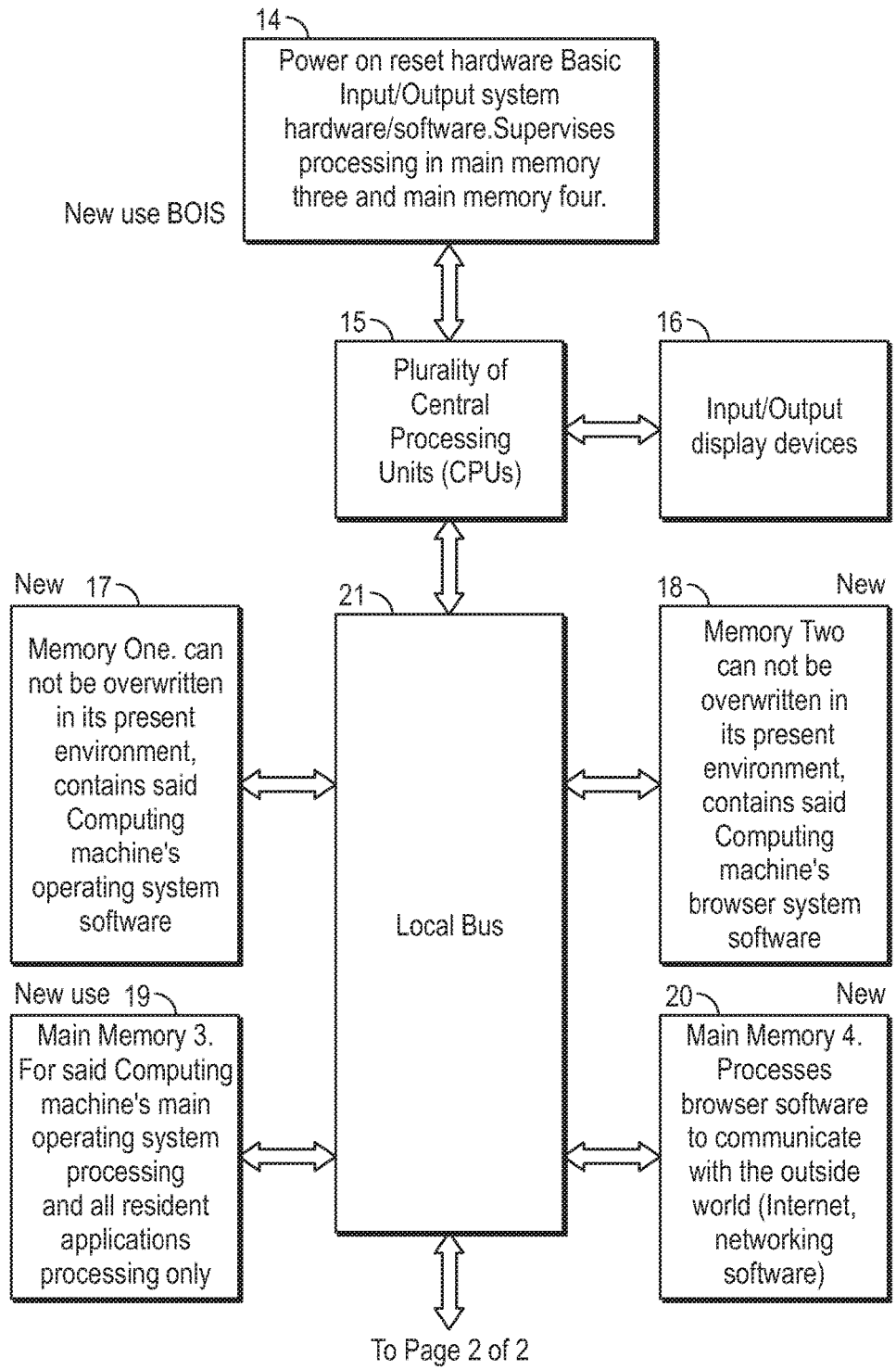
FIG. 2 is a Block Diagram of the proposed said Computing Machine System Motherboard.
Figure 2:
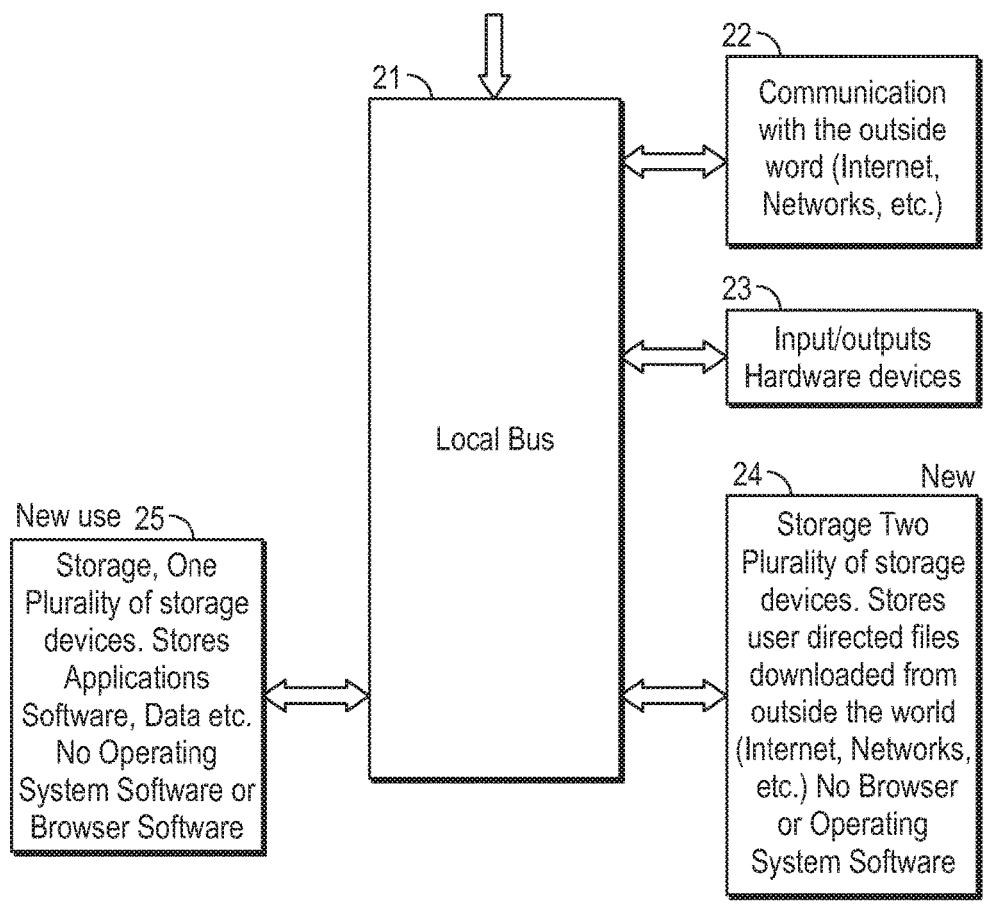
Figure 3:
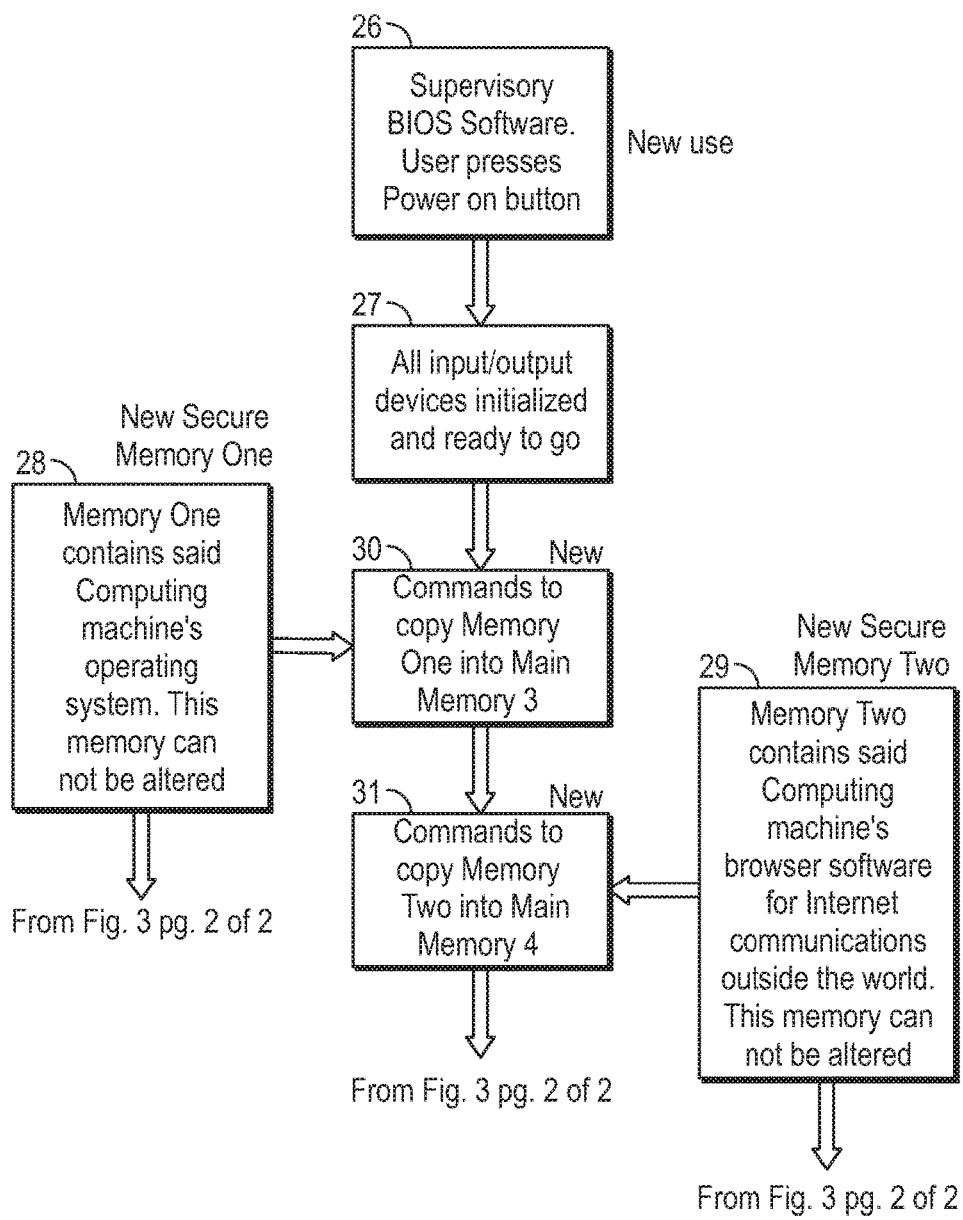
FIG. 3 is a Block Diagram of the proposed said Computing Machine's Operations.
Figure 3:
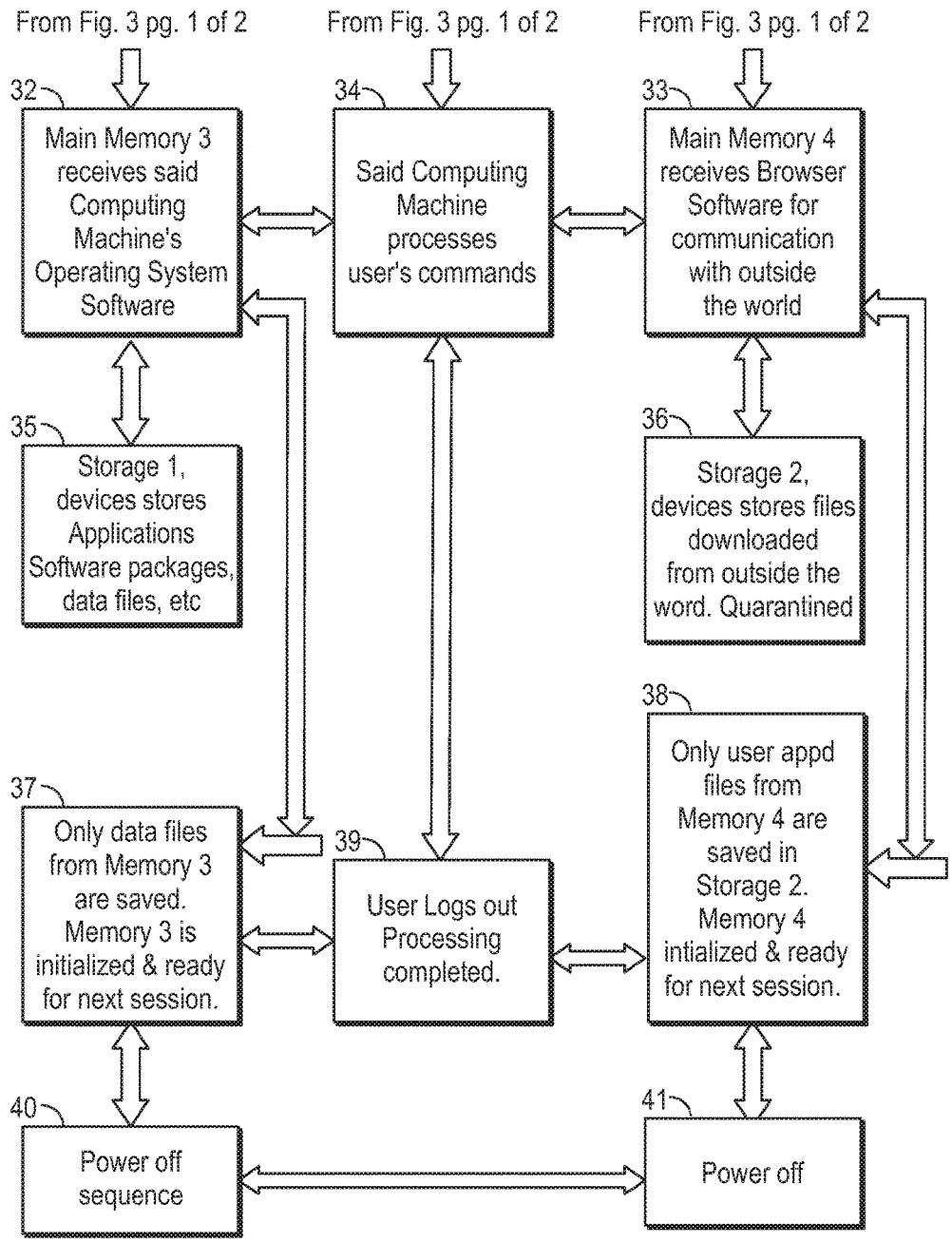

| FIG. 1 | | |
|---|---|---|
| Item 5 | Power On Basic Input/Output Software (BIOS) | (FIG. 1) |
| Item 6 | Central Processing Unit(s) | (FIG. 1) |
| Item 7 | Input/Output Display Devices | (FIG. 1) |
| Item 8 | Main Memory | (FIG. 1) |
| Item 9 | Backdoor Control of Motherboard | (FIG. 1) |
| Item 10 | Local Bus | (FIG. 1) |
| Item 11 | Communications with the outside world | (FIG. 1) |
| Item 12 | Input/output Hardware Devices | (FIG. 1) |
| Item 13 | Storage | (FIG. 1) |
| FIG. 2 | | |
| Item 14 | New Use BIOS | (FIG. 2, 4, 5, 6) |
| Item 15 | Central Processing Unit(s) | (FIG. 2, 4, 5, 6) |
| Item 16 | Input/Output Display Devices | (FIG. 2, 4, 5, 6) |
| Item 17 | Memory One | (FIG. 2, 5) |
| Item 18 | Memory Two | (FIG. 2, 4) |
| Item 19 | Main Memory 3 | (FIG. 2, 4, 5, 6) |
| Item 20 | Main Memory 4 | (FIG. 2, 4, 5, 6) |
| Item 21 | Local Bus | (FIG. 2, 4, 5, 6) |
| Item 22 | Communications with the outside world | (FIG. 2, 4, 5, 6) |
| Item 23 | Various Input/Output Devices Hardware | (FIG. 2, 4, 5, 6) |
| Item 24 | Storage Two | (FIG. 2, 4, 5, 6) |
| Item 25 | Storage One | (FIG. 2, 4, 5, 6) |
| FIG. 3 | | |
| Item 26 | Supervisory BIOS Software | (FIG. 3) |
| Item 27 | Input/Output Devices Hardware | (FIG. 3) |
| Item 28 | Memory One | (FIG. 3) |
| Item 29 | Memory Two | (FIG. 3) |
| Item 30 | Command to copy Memory One | (FIG. 3) |
| Item 31 | Command to copy Memory Two | (FIG. 3) |
| Item 32 | Main Memory 3 receives Operating System | (FIG. 3) |
| Item 33 | Main Memory 4 receives Browser Software | (FIG. 3) |
| Item 34 | Said Machine processes User's Commands | (FIG. 3) |
| Item 35 | Storage 1 | (FIG. 3) |
| Item 36 | Storage 2 | (FIG. 3) |
| Item 37 | Memory 3 saves Session's files | (FIG. 3) |
| Item 38 | Memory 4 saves User approved files | (FIG. 3) |
| Item 39 | User Logs out | (FIG. 3) |
| Item 40 | Power off sequence | (FIG. 3) |
| Item 41 | Power off | (FIG. 3) |

C. DETAILED DESCRIPTION—FIGS. 2 AND 3—PREFERRED EMBODIMENT

A preferred embodiment of the present invention of the proposed new Computing Machine is illustrated in FIG. 2 (Hardware Design) and FIG. 3 (Operations).

i. It has New Use BIOS (Basic Input Output System) see FIG. 2 Item 14. In addition to "Power On" reset hardware, it supervises processing in main Memory 3, FIG. 2 Item 19 and Main Memory 4, see FIG. 2 Item 20.
ii. It contains a plurality of Central Processing Units, FIG. 2 Item 15, connected to New Use BIOS, FIG. 2 Item 14, Input/Output display devices, FIG. 2 Item 16, Local Bus, FIG. 2 Item 21. The Local Bus facilitates communications of various hardwares with the CPUs.
iii. It has a plurality of Memory Devices, Memory One, FIG. 2 Item 17, and Memory Two, FIG. 2 Item 18, which cannot be overwritten or altered in its present environment. In other words once this memory is installed on the electronic device or it cannot be overwritten or altered by any other device or software without the user's approval.
iv. Memory One, FIG. 2 Item 17, contains the Main Operating System of said Computing Machine. Memory Two FIG. 2 Item 18, contains any Internet Browser Software from one or more vendors.
v. It uses two sets of Main Memories. One set of Main Memory 3, FIG. 2 Item 19, is used for the main computer processing exclusively. Another set of Main Memory 4, FIG. 2 Item 20, is used for any Internet Browser or Network(s) processing exclusively. These plurality of memory sets, FIG. 2 Item 19 and FIG. 2 Item 20 are not connected to each other. They are completely independent of each other and cannot send or receive information to or from each other.
vi. It has plurality sets of storage devices (Hard Drive etc.) connected internally and/or externally. One set of storage device(s), Storage One, FIG. 2 Item 25, is for the exclusive use of said computing machine's local processing. It contains all kinds of application software packages and associated or stand alone data files. Another set of storage device(s), Storage Two FIG. 2 Item 24 is for the exclusive use of any Internet Browser or Network(s). It contains all the files needed to facilitate the Internet Browsing but not Internet Browser Software packages. It may contain downloaded internet files. Storage One, FIG. 2 Item 25, and Storage Two, FIG. 2 Item 24 are not connected to each other and no information can be transferred to or from each other under normal operating circumstances.
vii. Any downloaded executable files will be tagged with IP addresses of the sender for identification purposes and or quarantined in a downloaded executable file folder. The internet downloadable files cannot execute automatically or on their own. They can only execute when the user initiates the execution with a specially protected command.

D. SOFTWARE OPERATION FLOW CHARTS FOR SAID COMPUTING MACHINE

FIG. 3. Is the flowchart of the operation of proposed new said Computing machine's system.
Operation of the Proposed Said Computing Machine.
BIOS (Basic Input and Output System) Software FIG. 3 Item 26. This is a new usage BIOS and it;
  i. Initiates all the input and output devices.
  ii. Copies the Operating System Software from Memory One, FIG. 3 Item 28, to Main Memory 3, FIG. 3 Item 32, and starts the operation.
  iii. Copies Internet Browser Software from Internet Browser Memory Two FIG. 3 Item 29, into internet browser Main Memory 4, FIG. 3 Item 33.
  iv. The Operating System Software and the Internet Browser Software run under the supervision of said BIOS, FIG. 3 Item 26.
  v. All the Application Software run under the supervision of the Operating System Software processing in Main Memory 3, FIG. 3 Item 32.
  vi. Power off is controlled by said BIOS, FIG. 3 Item 26.
  vii. Before the Power Off only the data files created during processing and NOT the application software packages are copied back to Storage One, FIG. 3 Item 35, from Main Memory 3, FIG. 3 Item 32.
  viii. Only the data files and NOT the executable files are copied back to Storage 2, FIG. 3 Item 36, from Main Memory 4, FIG. 3 Item 33.
  ix. The IP Addresses (on the allowed list of IP addresses) can receive any information in a specifically controlled manner as specified by the user. There is a provision for banning IP Addresses by the user.
  x. Extended role of BIOS. It supervises the Operating System Software and the Internet Browsing Software.
  xi. A plurality of storage devices, Storage One, are used for the Operating System Software for application software processing FIG. 3 Item 35.
  xii. Another plurality of storage devices, Storage Two, are used for Internet Browser Software processing FIG. 3 Item 36.
  xiii. A memory device, Memory One, which cannot be overwritten or altered in its present environment is used for storing Operating System Software, FIG. 3 Item 28.
  xiv. Another memory device, Memory Two, which cannot be overwritten or altered in its present environment is used for storing Internet Browser Software, FIG. 3 Item 29.
  xv. A set of Main Memory 3, FIG. 3 Item 32, provides the Operating System processing and another set of Main Memory 4, FIG. 3 Item 33 provides the Internet Browser processing.
  xvi. At the start of each session, Operating System Software is copied from said Memory One, a device which cannot be overwritten or altered in its present environment FIG. 3 Item 28 to said Main Memory 3, FIG. 3 Item 32.
  xvii. Internet Browser Software is copied from Memory Two, FIG. 3 Item 29, a device which cannot be overwritten or altered in its present environment, into Main Memory 4, FIG. 3 Item 33.
  xviii. The Operating System Software and the Internet Browser Software are NOT KEPT on any of the storage devices, FIG. 3 Item 35 and FIG. 3 Item 36 respectively.
  xix. At the end of each session, the Operating System Software and the Internet Browser Software are NOT copied back to any of the storage devices, FIG. 3 Item 35 and FIG. 3 Item 36 respectively.
  xx. The Main Memory 3, FIG. 3 Item 32, and the Internet Main Memory 4, FIG. 3 Item 33, are wiped clean at the end of each session.

E. DESCRIPTION AND OPERATION OF ALTERNATIVE EMBODIMENTS

Description of Embodiment 1

Figure 4:
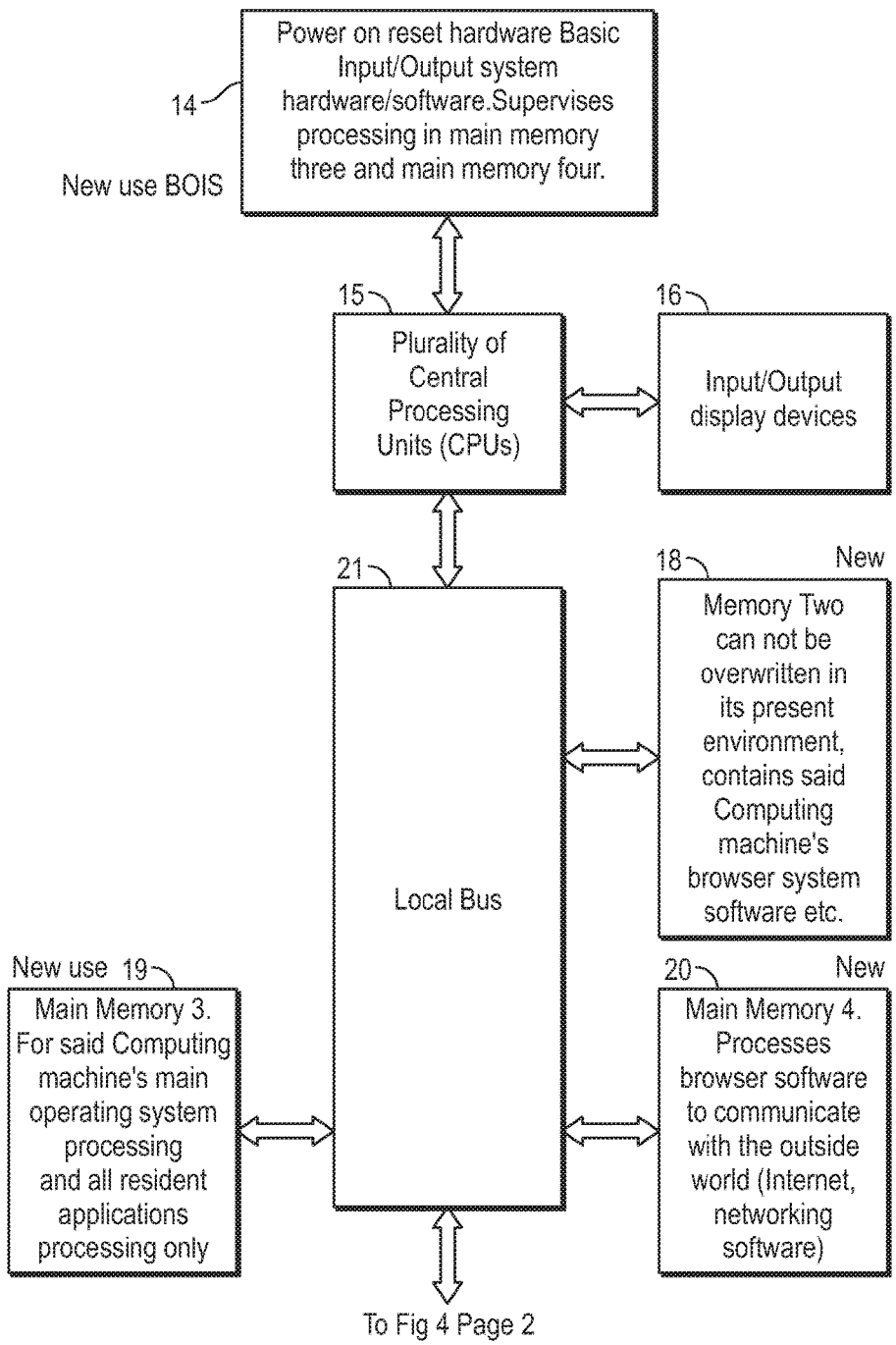
FIG. 4 is a Block Diagram of Embodiment 1 of the proposed said Computing Machine System Motherboard.
Figure 4:
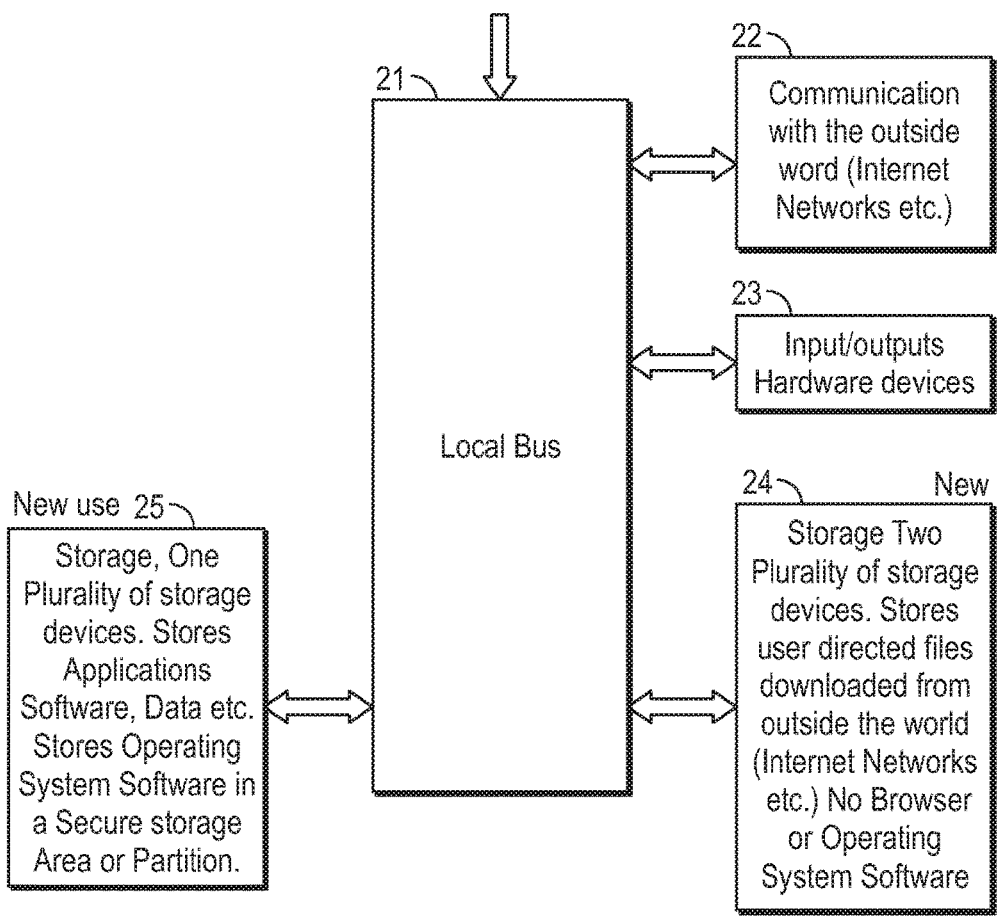

In this Computing Machine Embodiment 1 Memory One, FIG. 2 Item 17, is removed. The Operating System Software resides at Storage One, FIG. 4 Item 25, on Secure Area or Partition that cannot be overwritten or erased by any software. During the operation of said Computing Machine Embodiment 1 the Operating System Software is copied from Storage One, FIG. 4 Item 25, into Main Memory 3, FIG. 4 Item 19, and the processing starts as usual. Other than this change the operation of said Computing Machine remains the same.

Description of Embodiment 2

Figure 5:
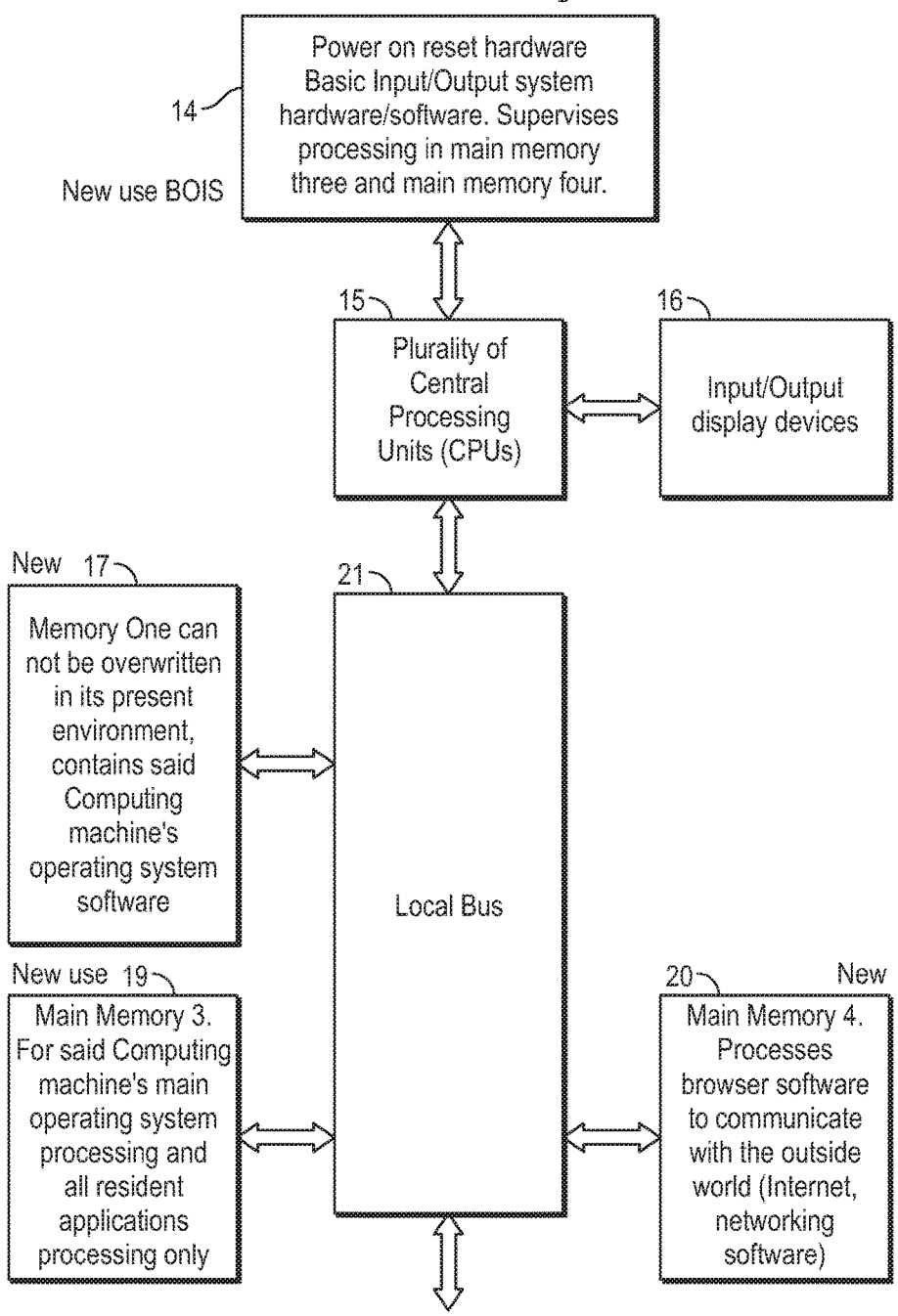
FIG. 5 is a Block Diagram of Embodiment 2 of the proposed said Computing Machine System Motherboard.
Figure 5:
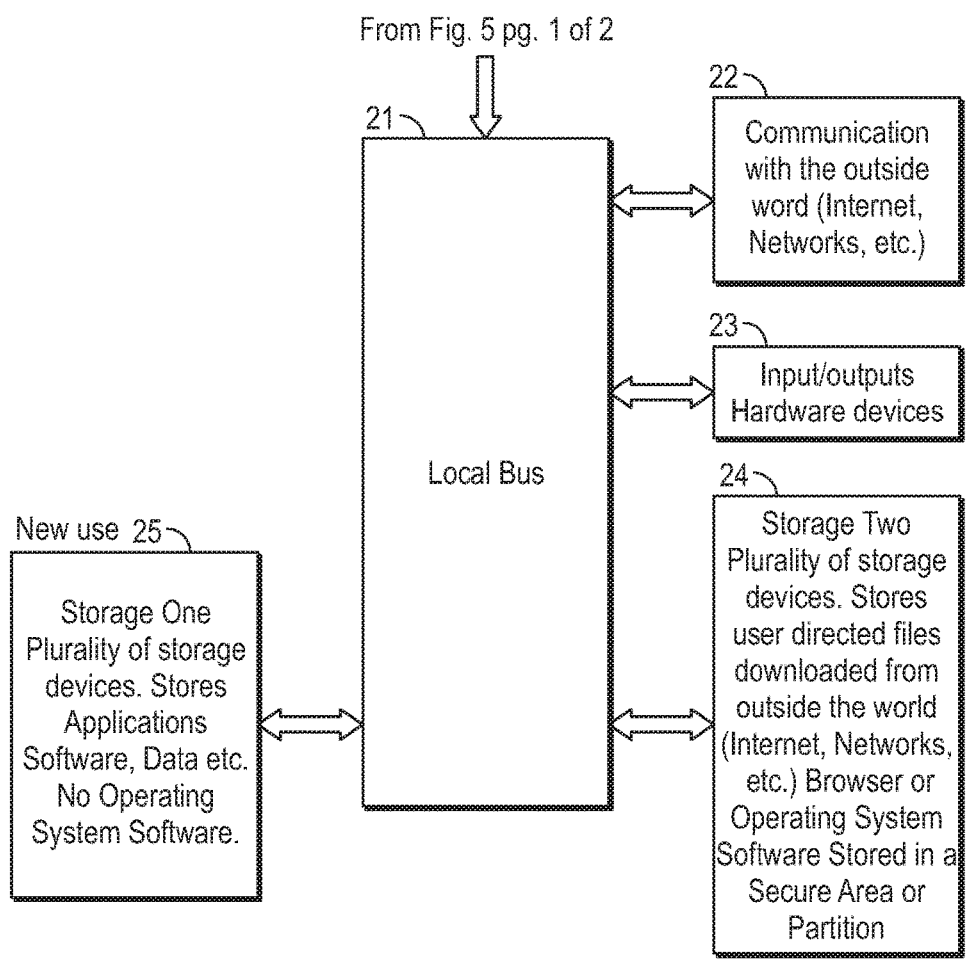

In this Computing Machine Embodiment 2 Memory Two, FIG. 2 Item 18, is removed. The Browser Software resides at Storage Two, FIG. 5 Item 24, on Secure Area or Partition that cannot be overwritten or erased by any software. During the operation of said Computing Machine Embodiment 2 the Browser Software is copied from Storage Two, FIG. 5 Item 24, into Main Memory 4, FIG. 5 Item 20, and the processing starts as usual. Other than this change the operation of said Computing Machine remains the same.

Description of Embodiment 3

Figure 6:
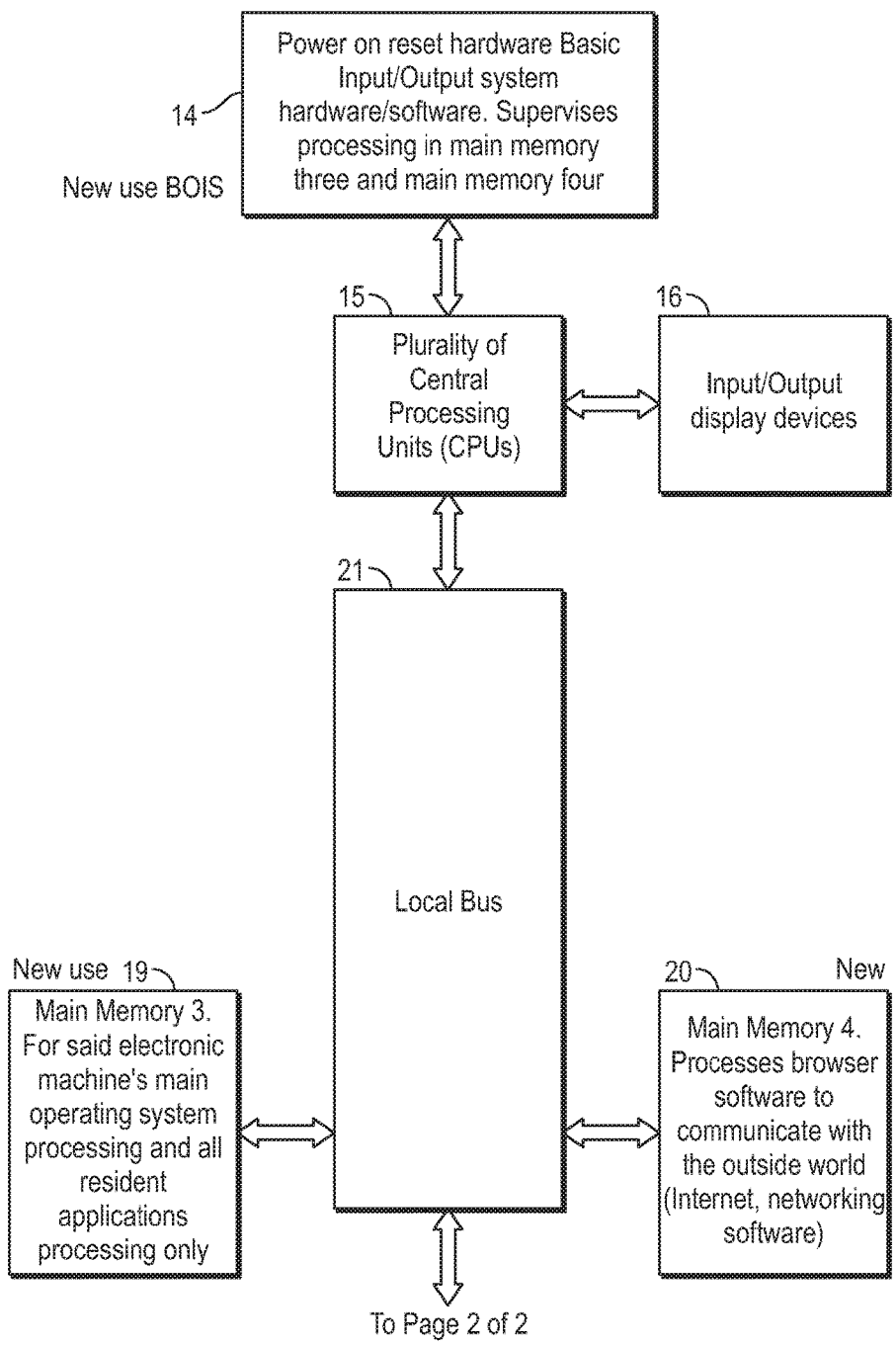
FIG. 6 is a Block Diagram of Embodiment 3 of the proposed said Computing Machine System Motherboard.
Figure 6:
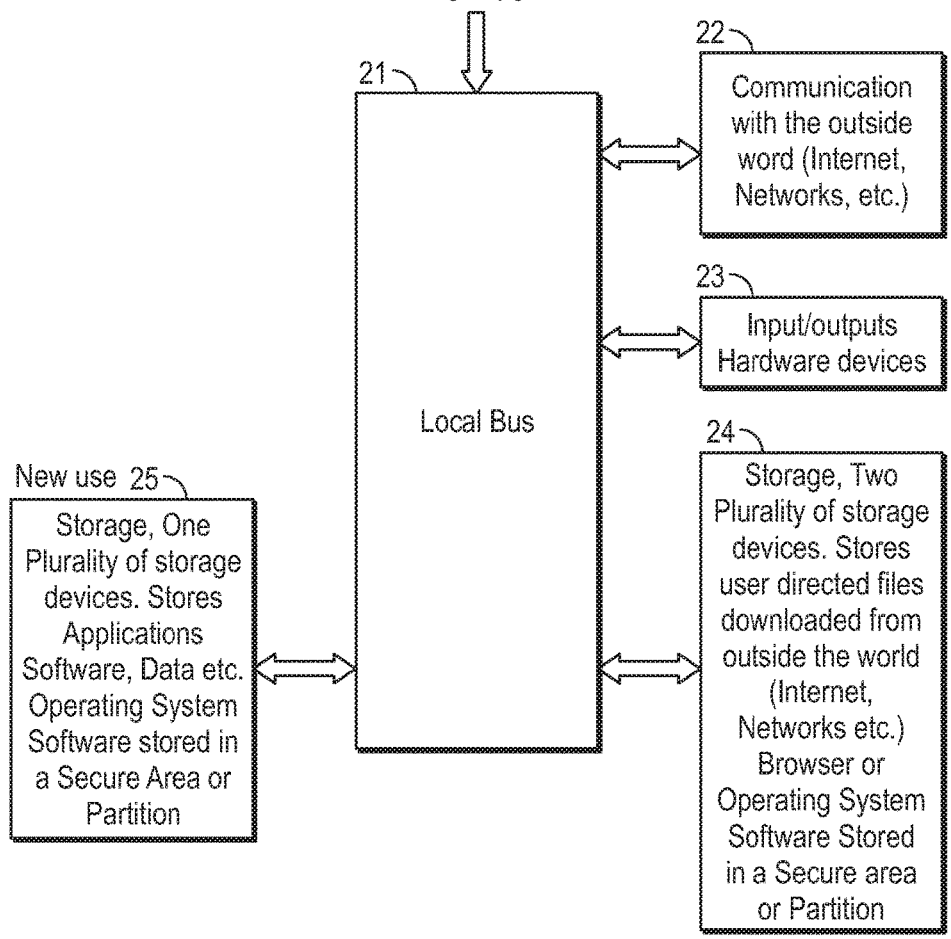

In this Computing Machine Embodiment 3 Memory One, FIG. 2 Item 17, and Memory Two, FIG. 2. Item 18, are removed. The Operating System Software resides at Storage One, FIG. 6 Item 25, on Secure Area or Partition that cannot be overwritten or erased by any software. The Browser Software resides at Storage Two, FIG. 6 Item 24, on Secure Area or Partition that cannot be overwritten or erased by any software. During the operation of said Computing Machine Embodiment 3 the Operating System Software is copied from Storage One, FIG. 6 Item 25, into Main Memory 3, FIG. 6 Item 19. During the operation of said Computing Machine Embodiment 3 the Browser Software is copied from Storage Two, FIG. 6 Item 24, into Main Memory 4, FIG. 6 Item 20. And the processing starts as usual. Other than these changes the operation of said Computing Machine remains the same.

F. ADVANTAGES

The main advantages of this Computing machine are that;
i) It cannot be corrupted.
ii) It cannot be rendered useless temporarily or permanently.
iii) It cannot be hijacked.
iv. It cannot be remotely tempered with.
v. The Main Operating System Software cannot be altered, corrupted, or deleted by any outside intruder via the outside communication devices like internet, other networks etc.
vi. The internet browser software cannot be altered, corrupted, or deleted by any outside intruder via the outside communication devices like internet, other networks etc.
vii. If for some rare chance a virus or malware sneaks into said Machine it will not affect the Main Operating System Software in any way but might impact the Browser System Software. If that happens a user friendly system software will analyze the problem, identify and delete the virus or malware files and ban such files and IP addresses where it came from for future downloads. User has control over which Country and which IP Addresses are allowed to get in and which are banned.
viii. The setup and process described in said Computing Machine will provide security and peace of mind for the average user. The businesses will have the confidence that their confidential information such as personal or financial information is secured from criminals including hackers etc. Bank accounts, personal records like medical information, government information like Federal and State income Tax information, Social Security Information, Credit Card Information of the users and businesses will be safe.

G. CONCLUSIONS, RAMIFICATIONS AND SCOPE

The reader will see that this invention can be used to protect user's information on any present or future Computing Machine that is connected to the outside world communications such as internet, networks, remote sensing devices, mobile or cell phones etc.

In addition the user is protected when a software virus, malware, spyware, hackers etc. tries to temper, alter or steal the user's information.

It will create visible evidence and traces of virus and malware attempts.

Said Computing Machine's Operating System, with all its applications, data files and main software are not accessible to the outside world communications (e.g. internet, networks etc.)

Any virus, malware or hacker's software, if and when it manages to enter through the browser's side will be quarantined and the malicious software is not allowed to self execute.

Because of the above advantages of this invention compared to the existing Computing Machines, the users are able to enjoy the peace of mind that their private information is secured from prying eyes.

This invention saves time and money as follows:
Monthly or yearly subscriptions for security (e.g. virus protection and removal) software & services.
Countless hours of time & money spent to recover data files.
Money spent on local repair shops or tech support services on removal of viruses, malware, spyware and recovery or restoration of data files.
Countless time or money spent on reformatting hard drives in order to remove virus & restore Computing Machine to factory settings or a state previous to when the virus infected the device & corrupted the system or introduced unwanted activities.
Prevents from loosing important files that may otherwise never be able to recover.
Prevents ransom demands from hackers who have hijacked the user's system since the Applications, Main Operating System & Data Files are separated from the browser side interaction.
If the browser side is infected with a malicious software, the user is able to shut down the Computing Machine wiping the memory clean so that the malicious software is completely deleted.
The browser side operates independent of Main Operating System Software side (containing important applications & data files) and consequently, said Computing Machine is always operational.
If malicious software is able to get into the browser storage area it is quarantined & forbidden to execute by itself.
It provides a faster processing because of dedicated memory & dedicated storage on browser processing side and main application processing side.

J. SUMMARY

A greatly improved and secured Computing Machine design whereby solves the problem of hijacking and tampering with its operation when connected to the internet and or networks etc.

This design does not reduce the effectiveness of the Computing Machine in any manner whatsoever. The design applies to devices like Personal Computers, Computer Laptops, Computer Servers, Mainframe Computers, any kind of Cell Phones etc. This design applies to any Computing Machine that does computing or transfer information over the internet and or networks.

The big advantages are that it saves the user loss of countless hours in repairs, money, frustration, annoyance, irritation and shock when a device becomes infected with the virus and or malware etc. It also provides comfort and peace of mind that the user's information is safe and sound and that they have a reliable Computing Machine.

In the rare event of infection there is a user friendly software to crush the problem in its infancy.

The following is a tabulation of same prior art that might be remotely relevant.

| Pat. No. | Kind Code | Filling Date | Publication Date | Applicant | Title/ Classification |
|---|---|---|---|---|---|
| U.S. Pat. No. 5,555,158 A | | Jan. 30, 1995 | Sep. 10, 1996 | David Dent, Intel Corporation | Motherboard for personal computer standard desktop chassis 361/679.32, 361/679.48 |
| U.S. Pat. No. 6,463,537 B1 | | 4 Jan. 1999 | 8 Oct. 2002 | Jose Alberto Tello Codex Technologies, Inc. | Modified computer motherboard security and identification system 713/182, 380/277, 713/185 |
| U.S. Pat. No. 7,350,067 B2 | | 22 Jun. 2005 | 25 Mar. 2008 | Jason Spottswood Hewlett-Packard Development Company, L.P. | Bios security management 713/1, 726/34, 726/4, 713/2 |
| U.S. Pat. No. 8,407,469 B2 | | 24 Aug. 2010 | 26 Mar. 2013 | Scott C. Harris | Protection against unintentional file changing 713/165 |
| U.S. Pat. No. 8,549,640 B2 | | 12 Feb. 2008 | 1 Oct. 2013 | Michael P. Lyle, Robert F. Ross, James R. Maricondo Symantec Corporation | System and method for computer security 726/23, 726/22, 726/26, 726/24, 726/27, 726/28 |
| U.S. Pat. No. 5,237,616 A | | 21 Sep. 1992 | 17 Aug. 1993 | Dennis G. Abraham, Steven G. Aden IBM Corporation | Secure computer system having privileged and unprivileged memories 713/193, 713/190, 711/163, 711/E12.092 |
| U.S. Pat. No. 5,564,040 A | | 8 Nov. 1994 | 8 Oct. 1996 | Jeffrey P. Kubala IBM Corporation | Method and apparatus for providing a server function in a logically partitioned hardware machine, 711/173, 711/163 |
| U.S. Pat. No. 5,615,263 A | | 6 Jan. 1995 | 25 Mar. 1997 | Richard J. Takahashi Vlsi Technology, Inc. | Dual purpose security architecture with protected internal operating system 713/164, 712/E09.035, 713/189, 711/E12.1 |
| U.S. Pat. No. 5,657,445 A | | 26 Jan. 1996 | 12 Aug. 1997 | John J. Pearce Dell Usa, L.P. | Apparatus and method for limiting access to mass storage devices in a computer system 726/23, 712/244, 711/163, 711/E12.097, 710/37 |
| U.S. Pat. No. 5,764,889 A | | 26 Sep. 1996 | 9 Jun. 1998 | Donald Fred Ault, Ernest Scott Bender, Michael Gary Spiegel IBM Corporation | Method and apparatus for creating a security environment for a user task in a client/sewer system 726/17, 709/226, 709/229 |
| U.S. Pat. No. 6,249,872 B1 | | 5 Jan. 1998 | 19 Jun. 2001 | Frank L. Wildgrube, Mark Albrecht Intel Corporation | Method and apparatus for increasing security against unauthorized write access to a protected memory 726/2, 711/E12.094 |
| U.S. Pat. No. 6,272,533 B1 | | 16 Feb. 1999 | 7 Aug. 2001 | Hendrik A. Browne | Secure computer system and method of providing secure acce-access to a computer system In-including a stand alone switch operable to inhibit data corruption on a storage device 709/213, 711/154, 711/152, 711/111, 711/100, 710/316 |
| U.S. Pat. No. 6,463,537 B1 | | 4 Jan. 1999 | 8 Oct. 2002 | Jose Alberto Tello Codex Technologies, Inc. | Modified computer motherboard security and identification system 713/182, 380/277, 713/185 |
| U.S. Pat. No. 6,986,052 B1 | | 30 Jun. 2000 | 10 Jan. 2006 | Millind Mittal Intel Corporation | 713/190, 713/189, 711/E12.101, 711/E12.097 |

-continued

U.S. Pat. No. PATENTS

| Pat. No. | Kind Code | Filling Date | Publication Date | Applicant | Title/ Classification |
|---|---|---|---|---|---|
| U.S. Pat. No. 7,124,170 B1 | | 21 Aug. 2000 | 17 Oct. 2006 | W. Olin Sibert Intertrust Technologies Corp. | Secure processing unit systems and methods 709/216, 711/103, 711/153, 711/206, 711/E12.102, 713/164 |
| US 20020166061 A1 | | 7 May 2001 | 7 Nov. 2002 | Ohad Falik, Michal Schramm | Flash memory protection scheme shared for secured BIOS implementation in personal computers with an embedded controller 726/34, 711/E12.099 |
| US 20030140238 A1 | | 31 Dec. 2002 | 24 Jul. 2003 | Mustafa Turkboylari Texas Instruments Incorporated | Implementation of a secure computing environment by using a secure bootloader, shadow memory and protected memory 713/193 |
| U.S. Pat. No. 8,756,390 B2 | | 5 Dec. 2005 | 17 Jun. 2014 | Simon Chu, William J. Piazza IBM Corporation | Methods and apparatuses for protecting data on mass storage devices 711/163, 711/111, 711/100, 711/154 |
| U.S. Pat. No. 8,924,728 B2 | | 30 Nov. 2004 | 30 Dec. 2014 | Ernest F. Brickell Intel Corporation | Apparatus and method for establishing a secure session with a device without exposing privacy-sensitive information 713/176, 713/168 |
| WO 2006091997 A1 | | 1 Mar. 2005 | 8 Sep. 2006 | Grover Latham Howard, 3 More >> | Security system for computers G06F21/88, G06F21/70, G06F21/575, G06F21/78 |
| WO2002095571A1 | | 10 May 2002 | 28 Nov. 2002 | O2 Micro, Inc. | Pre-boot authentication system |
| WO2004010395A1 | | 24 Jul. 2003 | 29 Jan. 2004 | Evatayhow Holdings Pty Ltd | Theft deterrence security system |
| US20020087877 | | 28 Dec. 2000 | 4 Jul. 2002 | Grawrock David W. | Platform and method of creating a secure boot that enforces proper user authentication and enforces hardware configurations |

NON PATENT LITERATURE DOCUMENTS
Following is small list of articles discussing problems associated with the existing Computing Machines and its negative effects on the society in general.

| Article in Publication | Date Published | Title of the Article |
|---|---|---|
| Los Angeles Times Editorial Sec A | 21 Aug. 2016 | NSA-Linked Cyber Thieves |
| Los Angeles Times Sec A | 19 May 2017 | Armed Robbers of the Internet |
| Los Angeles Times Sec B | 6 Jun. 2017 | Bill to Help Cyber Attack Victims Faces Obstacle |

What is claimed is:

1. A computing machine with local operations separated from external operations; wherein the computing machine comprises:
a plurality of Central Processing Units;
a Main Memory 3, wherein Main Memory 3 is in communication with the plurality of Central Processing Units;
a Main Memory 4 that is in communication with the plurality of Central Processing Units;
a Storage One device for non-transitory storage of application programs and data that is in communication with the plurality of Central Processing Units; and
a Storage Two device for non-transitory storage of other application programs and other data that is in communication with the plurality of Central Processing Units;
wherein the Main Memory 3 and the Storage One device are all operationally independent and not in communication with the Main Memory 4 nor in communication with the Storage Two device;
wherein the Main Memory 3 and the Storage One device are all for the local operations; and
wherein the Main Memory 4 and the Storage Two device are all for the external operations; wherein the external operations are associated with communications from outside of the computing machine; wherein external files from external operations are isolated from the Main Memory 3 and from the Storage One device.

2. The computing machine according to claim 1, wherein the Storage One device comprises a secure partition region that cannot be overwritten; wherein this secure partition region comprises non-transitory storage of a main operating system software; and wherein the Storage Two device comprises a different secure partition region that cannot be overwritten; wherein this different secure partition region comprises non-transitory storage of at least one internet browsing application program.

3. The computing machine according to claim 1, wherein the computing machine further comprises a Memory One comprising non-transitory storage of a main operating system software; wherein the Memory One is in communication with the plurality of Central Processing Units; and wherein the Storage Two device comprises a secure partition region that cannot be overwritten; wherein this secure partition region comprises non-transitory storage of at least one internet browsing application program; wherein the Memory One is operationally independent and not in communication with the Main Memory 4 nor with the Storage Two device; wherein the Memory One is for the local operations; wherein the external files are isolated from the Memory One.

4. The computing machine according to claim 3, wherein the Memory One cannot be overwritten.

5. The computing machine according to claim 1, wherein the Storage One device comprises a secure partition region that cannot be overwritten; wherein this secure partition region comprises non-transitory storage of a main operating system software; and wherein the computing machine further comprises a Memory Two comprising non-transitory storage of at least one internet browsing application program; wherein the Memory Two is in communication with the plurality of Central Processing Units; wherein the Main Memory 3 and the Storage One device are all operationally independent and not in communication with the Memory Two; and wherein the Memory Two is for the external operations.

6. The computing machine according to claim 5, wherein the Memory Two cannot be overwritten.

7. The computing machine according to claim 1, wherein the computing machine further comprises a Memory One comprising non-transitory storage of a main operating system software; wherein the Memory One is in communication with the plurality of Central Processing Units; and wherein the computing machine further comprises a Memory Two comprising non-transitory storage of at least one internet browsing application program; wherein the Memory Two is in communication with the plurality of Central Processing Units; wherein the Memory One is operationally independent and not in communication with the Memory Two, not with the Main Memory 4, and not with the Storage Two device; wherein the Memory One is for the local operations; and wherein the Memory Two is for the external operations; wherein the external files are isolated from the Memory One.

8. The computing machine according to claim 7, wherein the Memory One and the Memory Two each cannot be overwritten.

9. The computing machine according to claim 1, wherein the computing machine further comprises a Local Bus for facilitating communications with the plurality of Central Processing Units; wherein the Local Bus is in communication with the plurality of Central Processing Units; and wherein the Local Bus is in communication with at least two of: a Memory One; a Memory Two; the Main Memory 3; the Main Memory 4; the Storage One device; and the Storage Two device; the Memory One is for the local operations; wherein the Memory Two is for the external operations; wherein the external files are isolated from the Memory One.

10. A computing machine with local operations separated from external operations; wherein the computing machine comprises:
   a plurality of Central Processing Units;
   a Memory One comprising non-transitory storage of a main operating system software; wherein the Memory One is in communication with the plurality of Central Processing Units;
   a Memory Two comprising non-transitory storage of at least one internet browsing application program; wherein the Memory Two is in communication with the plurality of Central Processing Units;
   a Main Memory 3, wherein the Main Memory 3 is in communication with the plurality of Central Processing Units;
   a Main Memory 4 that is in communication with the plurality of Central Processing Units;
   a Storage One device for non-transitory storage of application programs and data that is in communication with the plurality of Central Processing Units; and
   a Storage Two device for non-transitory storage of other application programs and other data that is in communication with the plurality of Central Processing Units;
   wherein the Memory One, the Main Memory 3, and the Storage One device are all operationally independent and not in communication with the Memory Two, not in communication with the Main Memory 4, and not in communication with the Storage Two device;
   wherein the Memory One, the Main Memory 3, and the Storage One device are all for the local operations; and
   wherein the Memory Two, the Main Memory 4, and the Storage Two device are all for the external operations; wherein the external operations are associated with communications from outside of the computing machine; wherein external files from external operations are isolated from the Memory One, from the Main Memory 3, and from the Storage One device.

11. The computing machine according to claim 10, wherein the computing machine further comprises a Local Bus for facilitating communications with the plurality of Central Processing Units; wherein the Local Bus is in communication with the plurality of Central Processing Units; and wherein the Local Bus is in communication with: the Memory One, the Memory Two, the Main Memory 3, the Main Memory 4, the Storage One device, and the Storage Two device.

12. The computing machine according to claim 10, wherein the Memory One and the Memory Two each cannot be overwritten.

13. The computing machine according to claim 10, wherein the Memory One and the Memory Two are each read only memories.

14. The computing machine according to claim 10, wherein after initial power up of the computing machine, a BIOS of the computing machine causes the main operating system software to be copied from the Memory One into the Main Memory 3 for operation and access by the plurality of Central Processing Units.

15. The computing machine according to claim 10, wherein after initial power up of the computing machine, a BIOS of the computing machine causes the at least one internet browsing application program to be copied from Memory Two into the Main Memory 4 for operation and access by the plurality of Central Processing Units.

16. The computing machine according to claim 10, wherein the Storage One device non-transitorily stores one or more of: the application programs or the data files.

17. The computing machine according to claim 10, wherein the Storage Two device non-transitorily stores one or more of: the other application programs or the other data files.

18. The computing machine according to claim 10, wherein the computing machine further comprises Input/Out display devices in communication with the plurality of Central Processing Units.

19. A method of computing for a single computing machine with local operations separated from external operations; wherein the method comprises steps of:
   receiving a power on input which initiates input and output devices;
   copying a main operating system software from a Memory One to a Main Memory 3 such that a plurality of Central Processing Units access the main operating system software; wherein the Memory One cannot be overwritten;

copying at least one internet browsing application program from a Memory Two to a Main Memory 4; such the plurality of Central Processing Units access the at least one internet browsing application program; wherein the Memory Two cannot be overwritten; wherein the Memory One and the Main Memory 3 are operationally independent, separate, and not in communication with the Memory Two and not in communication with the Main Memory 4;

supervision of the main operating system software and the at least one internet browsing application program are carried out by a BIOS of the single computing machine;

processing of the local operations by the plurality of Central Processing Units accessing application software under supervision of the main operating system software; wherein both the application software and the main operating system software are processing in the Main Memory 3; wherein the application software are non-transitorily stored in a Storage One device; and processing of the external operations by the plurality of Central Processing Units accessing external application software under supervision of the at least one internet browsing application program; wherein both the external application software and the at least one internet browsing application program are processing in the Main Memory 4; wherein the external application software are non-transitorily stored in a Storage Two device; wherein the Storage One device is operationally independent, separate, and not in communication with the Storage Two device;

wherein the single computing machine comprises the Memory One, the Main Memory 3, the Storage One device, the Memory Two, the Main Memory 4, and the Storage Two device.

20. The method according to claim 19, wherein data files associated with the application software are non-transitorily stored in the Storage One device; and wherein other data files associated with the at least one internet browsing application program or associated with the external application software are non-transitorily stored in the Storage Two device; wherein the other data files are isolated from the Memory One, from the Main Memory 3, and from the Storage One device.

* * * * *